(12) United States Patent
Saito

(10) Patent No.: US 11,487,319 B2
(45) Date of Patent: Nov. 1, 2022

(54) IMAGE DISPLAY DEVICE AND MANUFACTURING METHOD THEREOF ENABLING EASY INSTALLATION OF OPTICAL SENSOR

(71) Applicant: NEC Display Solutions, Ltd., Tokyo (JP)

(72) Inventor: Tatsuya Saito, Tokyo (JP)

(73) Assignee: Sharp NEC Display Solutions, Ltd., Tokyo (JP)

(*) Notice: Subject to any disclaimer, the term of this patent is extended or adjusted under 35 U.S.C. 154(b) by 205 days.

(21) Appl. No.: 16/975,849

(22) PCT Filed: Mar. 27, 2018

(86) PCT No.: PCT/JP2018/012310
§ 371 (c)(1),
(2) Date: Aug. 26, 2020

(87) PCT Pub. No.: WO2019/186675
PCT Pub. Date: Oct. 3, 2019

(65) Prior Publication Data
US 2020/0401184 A1      Dec. 24, 2020

(51) Int. Cl.
*G06F 1/16*      (2006.01)
*G09G 5/10*      (2006.01)
(52) U.S. Cl.
CPC ............. *G06F 1/1607* (2013.01); *G09G 5/10* (2013.01); *G09G 2360/14* (2013.01)

(58) Field of Classification Search
CPC ....... G06F 1/1607; G06F 1/1601; G09G 5/10; G09G 2360/14; F21V 23/00; G02F 1/1333; G09F 9/00
See application file for complete search history.

(56) References Cited

U.S. PATENT DOCUMENTS

| | | | |
|---|---|---|---|
| 11,294,236 B2* | 4/2022 | Liu | G09G 3/3406 |
| 2009/0262276 A1* | 10/2009 | Jeong | G02B 6/0085 |
| | | | 349/116 |

FOREIGN PATENT DOCUMENTS

| | | |
|---|---|---|
| JP | H11-249097 A | 9/1999 |
| JP | 2009-058678 A | 3/2009 |
| JP | 2009-265661 A | 11/2009 |
| JP | 2012-113825 A | 6/2012 |
| JP | 2012113825 A * | 6/2012 |
| KR | 10-2007-0072188 A | 7/2007 |

OTHER PUBLICATIONS

International Search Report (ISR) (PCT Form PCT/ISA/210), in PCT/JP2018/012310, dated Jun. 19, 2018.

* cited by examiner

*Primary Examiner* — Rodney Amadiz
(74) *Attorney, Agent, or Firm* — McGinn IP Law Group, PLLC

(57) ABSTRACT

An image display device has an image display unit including a display for displaying images and a backlight arranged behind the display to illuminate the display. The image display device includes an opening formed behind the image display unit, an optical sensor which detects light passing through the opening, and a sensor holder which holds the optical sensor, and the opening includes a protruding diaphragm and a passage hole.

5 Claims, 4 Drawing Sheets

IMAGE DISPLAY DEVICE AND MANUFACTURING METHOD THEREOF ENABLING EASY INSTALLATION OF OPTICAL SENSOR

TECHNICAL FIELD

The present invention relates to an image display device and a manufacturing method thereof.

BACKGROUND ART

A conventional image display device includes, for example, a display and a backlight provided behind the display. The backlight includes, for example, a light source and a reflection sheet disposed behind the light source. The backlight reflects and diffuses light radiated from the light source to emit planar light. As the reflection sheet, for example, a reflection sheet that reflects and diffuses light radiated from the backlight is provided.

Furthermore, an image display device that detects light radiated from a backlight and controls an input amount to a lamp for the backlight on the basis of the detection result has been proposed as a conventional image display device. For example, a technology in which an optical sensor is provided on the backside of a backlight, an opening is formed in a reflection sheet, and light is detected using the optical sensor through light leaking through the opening is disclosed (refer to Patent Literature 1, for example).

CITATION LIST

Patent Literature

[Patent Document 1]
Japanese Unexamined Patent Application, First Publication No. H10-222084

SUMMARY OF INVENTION

Problem to be Solved by the Invention

However, in installation of the optical sensor behind the backlight, there is a method of mounting the optical sensor on a sensor holder and mounting the sensor holder on the backside of the backlight, for example. In this method, a positional relationship between the opening and the optical sensor provided on the backside of the backlight is adjusted so that the sensor holder is mounted on the backside of the backlight.

However, there are various shapes of image display devices and various appearances of openings provided on the backside of a backlight. Accordingly, when a sensor holder is mounted on the backside of a backlight, for example, there are problems that the position at which the sensor holder is mounted is adjusted differently according to the shapes of the image display devices and installation of an optical sensor requires time and effort.

Accordingly, an object of the present invention is to provide an image display device and a manufacturing method thereof which can reduce time and effort required to install an optical sensor.

Means for Solving the Problem

An image display device of an aspect of the present invention is an image display device having an image display unit including a display for displaying images and a backlight arranged behind the display to illuminate the display, the image display device includes: an opening formed behind the image display unit; an optical sensor which detects light passing through the opening; and a sensor holder which holds the optical sensor, wherein the opening includes a protruding diaphragm and a passage hole.

Furthermore, a manufacturing method of an image display device of another aspect of the present invention is a manufacturing method of an image display device, including a display for displaying images, a backlight arranged behind the display to illuminate the display, an opening formed behind an image display unit, an optical sensor which detects light passing through the opening, and a sensor holder which holds the optical sensor, the manufacturing method includes: mounting a positioning jig on the opening; fixing the sensor holder positioned by the positioning jig to a backside of the image display unit; and removing the positioning jig after the mounting and the fixing.

Advantageous Effects of Invention

According to the above-described present invention, it is possible to provide an image display device and a manufacturing method thereof which can reduce time and efforts required to install an optical sensor.

DESCRIPTION OF EMBODIMENTS

Figure 1:
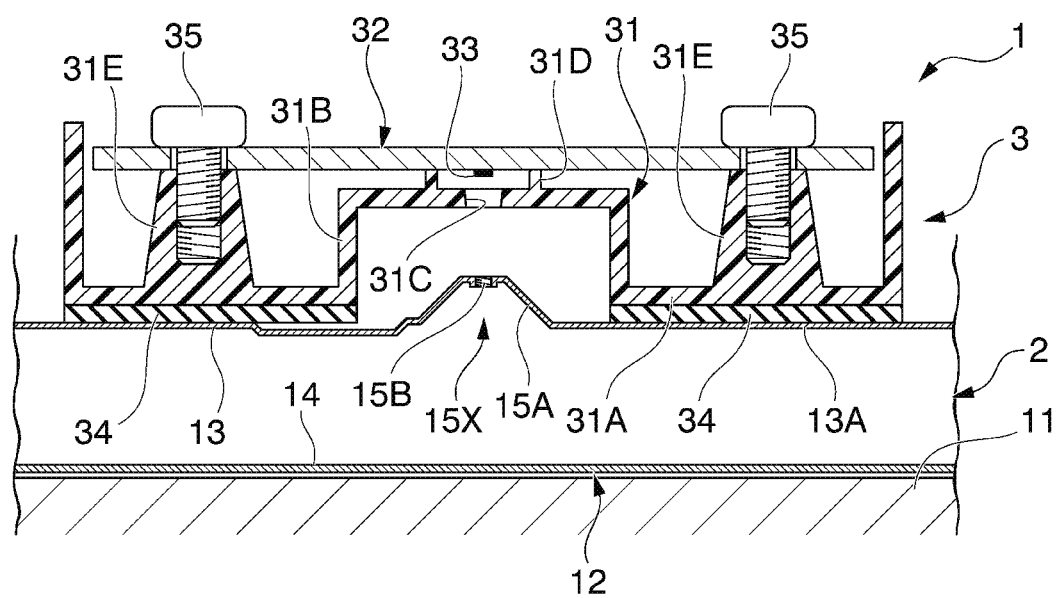
FIG. 1 is a cross-sectional view of a principal part of an image display device.
Figure 2:
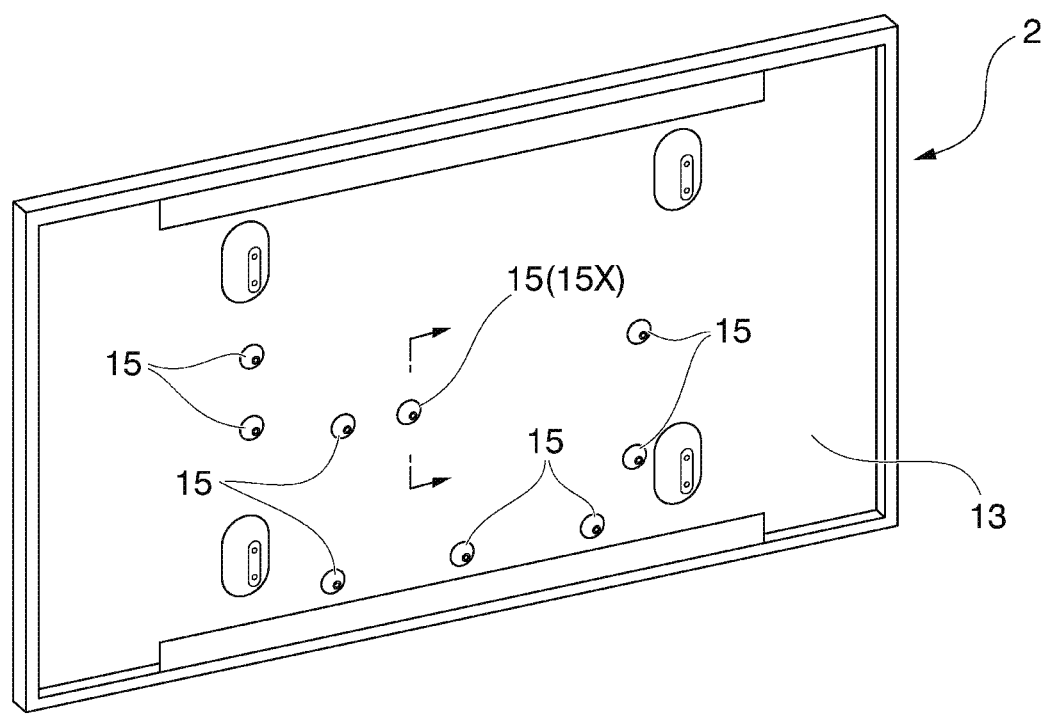
FIG. 2 is a perspective view of an image display unit from the backside thereof.

Hereinafter, an image display device and a manufacturing method thereof according to embodiments of the present invention will be described with reference to FIG. 1 to FIG. 7. FIG. 1 is a cross-sectional view of a principal part of an image display device and FIG. 2 is a perspective view of an image display unit from the backside thereof. As shown in FIG. 1, the image display device 1 includes the image display unit 2 and a light detector 3.

The image display unit 2 is composed of an LCD module, for example. The image display unit 2 includes a display 11 provided on the front side and a backlight 12 facing the display 11 and provided on the backside. The display 11 is composed of a liquid crystal material, an alignment film material, a glass substrate, spacers, a seal material, a polarizer, color filters, and the like, receives light radiated from the backlight 12 and displays a predetermined image on the front side.

The backlight 12 includes a box-shaped housing 13 with a front side opened. The inner face of the housing 13 serves as a reflection sheet 13A for reflecting light. An approximately bar-shaped fluorescent lamp which is not shown is provided inside the housing 13. Furthermore, a diffusion plate 14 is provided in front of the reflection sheet 13A. The reflection sheet 13A inside the housing 13 is provided for the purpose of reflecting light radiated from the fluorescent lamp to the display. The reflection sheet 13A is white in order to uniformly reflect colors of light with high efficiency. The backlight 12 illuminates the display 11 with planar light.

A plurality of diaphragm openings 15 are provided on the backside of the housing 13, as shown in FIG. 2. The diaphragm opening 15 includes a diaphragm 15A protruding to the back and a passage hole 15B is formed at the top of the diaphragm or near the top. A screw groove is formed at the passage hole 15B, and the passage hole 15B is formed as a screw hole. The diaphragm openings 15 are disposed at an approximately central position of the image display unit 2.

The light detector 3 includes a sensor holder 31, a sensor board 32 fixed to the sensor holder 31, and an optical sensor 33 provided on the sensor board 32. The light detector 3 is mounted at a position at which the optical sensor 33 is disposed behind a center diaphragm opening 15X among the plurality of diaphragm openings 15 shown in FIG. 2. The center diaphragm opening 15X is a diaphragm opening having the largest diaphragm shape of the diaphragm 15A among the plurality of diaphragm openings 15. The sensor holder 31 is adhered to the backside of the image display unit 2 (the backside of the backlight 12) using a double-sided tape 34. In addition, the sensor board 32 is fixed to the sensor holder 31 using screws 35. The sensor board 32 holds the optical sensor 33 as a sensor holding part.

The sensor holder 31 includes a flat part 31A. The flat part 31A is a part having an approximately rectangular shape in a front view and attached to the backside of the image display unit 2 using the double-sided tape 34. A retracted part 31B is provided at the approximately central part of the flat part 31A in a front view. The retracted part 31B is a part retracted backward from the flat part 31A and the shape thereof in a plan view is an approximately rectangular shape smaller than the flat part 31A.

A sensor inspection hole 31C serving as a positioning hole is provided at an approximately central part of the retracted part 31B in a front view. The sensor inspection hole 31C is disposed immediately behind the passage hole 15B in a front view. A partition plate 31D is provided on the backside of the approximately central part of the retracted part 31B in a front view. The partition plate 31D extends backward and the rear end thereof is in contact with the sensor board 32. The sensor holder 31 has a shape corresponding to the shape of the diaphragm 15A in the diaphragm opening 15.

Screw receiving parts 31E are provided on the backside of the flat part 31A. The screw receiving parts 31E are screw holes that are formed in an extending part extending backward and have a greater diameter and depth than a screw hole provided in the passage hole 15B. Accordingly, it is possible to perform fixing with a large force using screws fastened to the screw receiving parts 31E.

The sensor board 32 is a printed board, for example, holds the optical sensor 33, and has various elements such as capacitors and transistors mounted thereon. Through-holes are formed at positions corresponding to the screw receiving parts 31E of the sensor holder 31 in the sensor board 32. The screws 35 penetrating the through-holes are fastened to the screw receiving parts 31E of the sensor holder 31 so that the sensor board 32 is fixed to the sensor holder 31.

The optical sensor 33 held by the sensor board 32 detects light input through openings formed in the sensor board 32. The luminance and chromaticity of light of the fluorescent lamp provided in the backlight 12 are measured and measurement results are transmitted to a control device which is not shown. The control device controls the amount of luminescence of the fluorescent lamp in the backlight 12 on the basis of the transmitted luminance, chromaticity, and the like.

The sensor holder 31 and the sensor board 32 are molded in such a manner that the shapes and sizes thereof are adjusted in advance. Accordingly, the screws 35 penetrating the through-holes provided in the sensor board 32 are fastened to the screw receiving parts 31E of the sensor holder 31 and thus the sensor board 32 is mounted on the sensor holder 31 so that the optical sensor 33 is disposed immediately behind the sensor inspection hole 31C.

Figure 3:
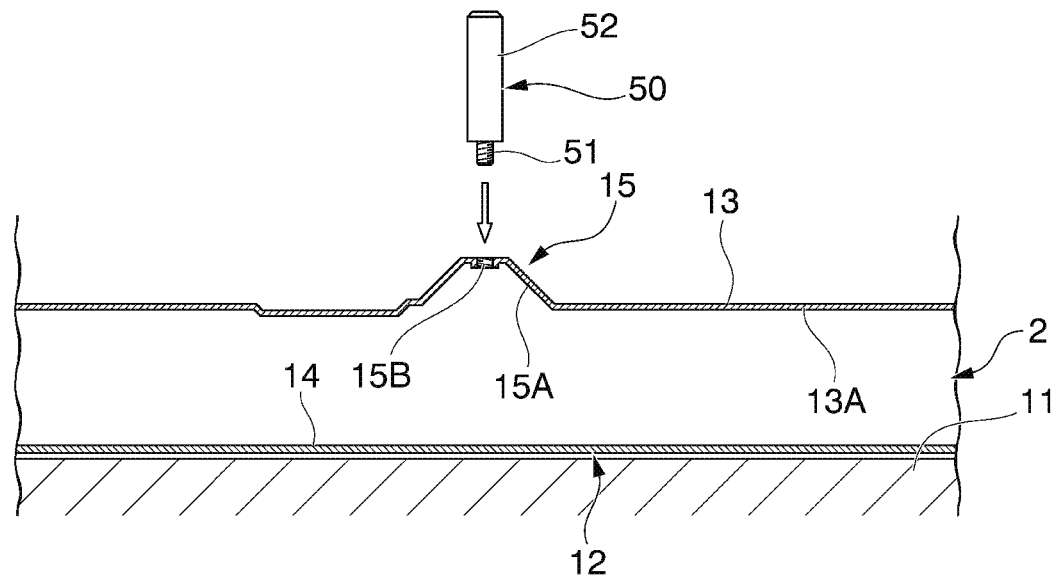
FIG. 3 is a diagram showing an image display device manufacturing process.
Figure 4:
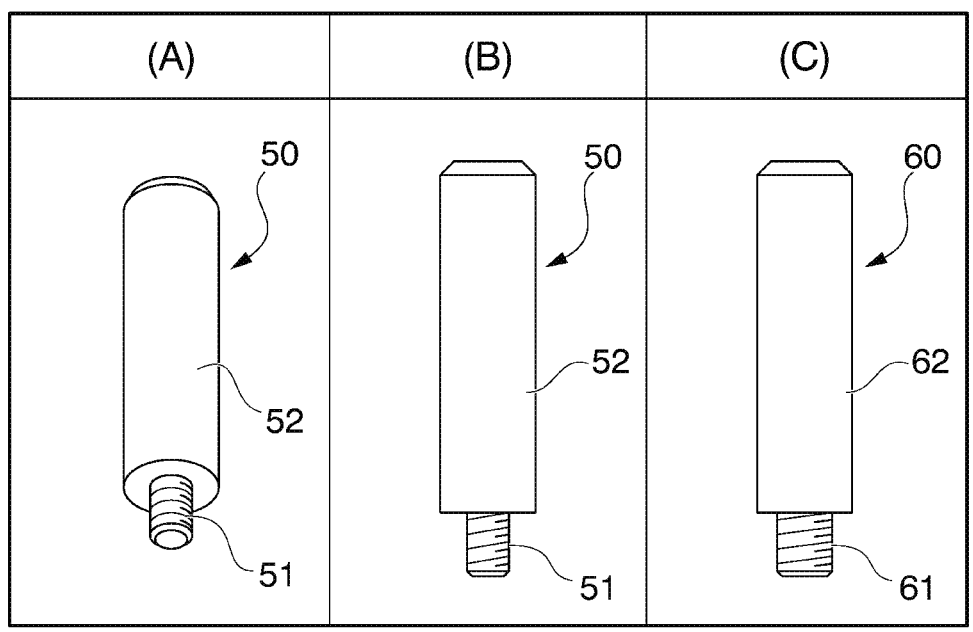
FIG. 4(A) is a perspective view of a positioning jig, (B) is a front view of the positioning jig, and (C) is a front view of a modified example of the positioning jig.

Next, a manufacturing procedure of the image display device 1 of the present embodiment will be described. Here, a procedure of mounting the light detector 3 on the image display unit 2 will be chiefly described. After the image display unit 2 is prepared, the image display unit 2 is mounted on a flat area, for example, a desk, such that the display 11 faces down. Then, a positioning jig 50 is fitted into the passage hole 15B in the diaphragm opening 15 on the backside of the image display unit 2, as shown in FIG. 3. Here, the positioning jig 50 will be described.

The positioning jig 50 includes a screw part 51 and a jig part 52, as shown in FIGS. 4(A) and (B). The screw part 51 has the same diameter as the screw hole provided in the passage hole 15B of the diaphragm opening 15 in the housing 13. The jig part 52 has the same diameter as the sensor inspection hole 31C provided in the sensor holder 31. Since the diaphragm opening 15 has the diaphragm 15A protruding backward, it does not reach the surface of the image display unit 2 even when the screw part 51 of the positioning jig 50 penetrates the passage hole 15B. That is, even when the positioning jig 50 is mounted on the diaphragm opening 15, it does not damage the image display unit 2. In addition, various types of positioning jigs 50 can be used because an allowable range of the length of the screw part 51 is widened.

Furthermore, a positioning jig 60 shown in FIG. 4(C) may be used as a positioning jig instead of the positioning jig 50 shown in FIGS. 4(A) and (B). The positioning jig 60 includes a screw part 61 and a jig part 62 like the positioning jig 50. The diameter of the screw part 61 of the positioning jig 60 shown in FIG. 4(C) is greater than the diameter of the screw part 51 of the positioning jig 50 shown in FIGS. 4(A) and (B). Furthermore, the diameter of the jig part 62 of the positioning jig 60 shown in FIG. 4(C) is the same as that of the jig part 52 of the positioning jig 50 shown in FIGS. 4(A) and (B).

In addition, when the light detector 3 is installed, a plurality of positioning jigs having different diameters of screw parts and a common diameter of jig parts are prepared in addition to the positioning jig 50 shown in FIGS. 4(A) and (B) and the positioning jig 60 shown in FIG. 4(C) and a positioning jig selected therefrom may be used.

Figure 5:
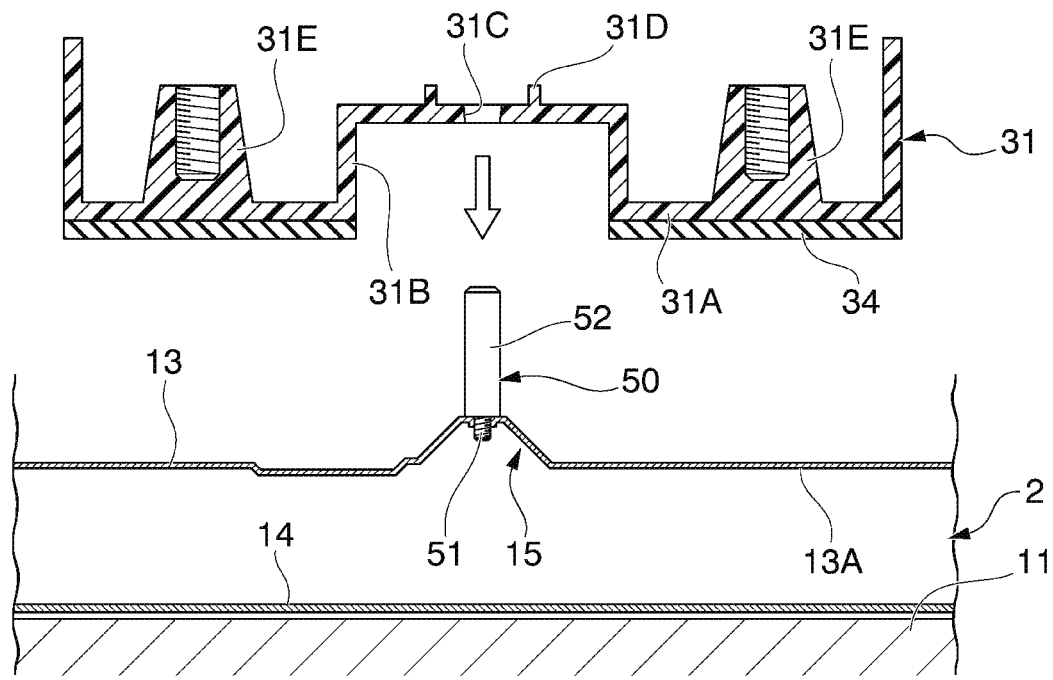
FIG. 5 is a diagram showing a manufacturing process subsequent to FIG. 3.

In this manner, when the positioning jig 50 is fitted into the diaphragm opening 15 on the backside of the image display unit 2, the sensor holder 31 is mounted on the image display unit 2. When the sensor holder 31 is mounted on the image display unit 2, the sensor holder 31 is moved down to the image display unit 2, as shown in FIG. 5. The jig part 52 of the positioning jig 50 is inserted into the sensor inspection hole 31C of the sensor holder 31 in the process of moving down the sensor holder 31. The sensor inspection hole 31C is disposed immediately behind the passage hole 15B with high accuracy in a front view by inserting the jig part 52 of the positioning jig 50 into the sensor inspection hole 31C of the sensor holder 31. In other words, the sensor inspection hole 31C is superposed on the passage hole 15B in a front view. In this manner, the sensor inspection hole 31C serves as a positioning hole.

Figure 6:
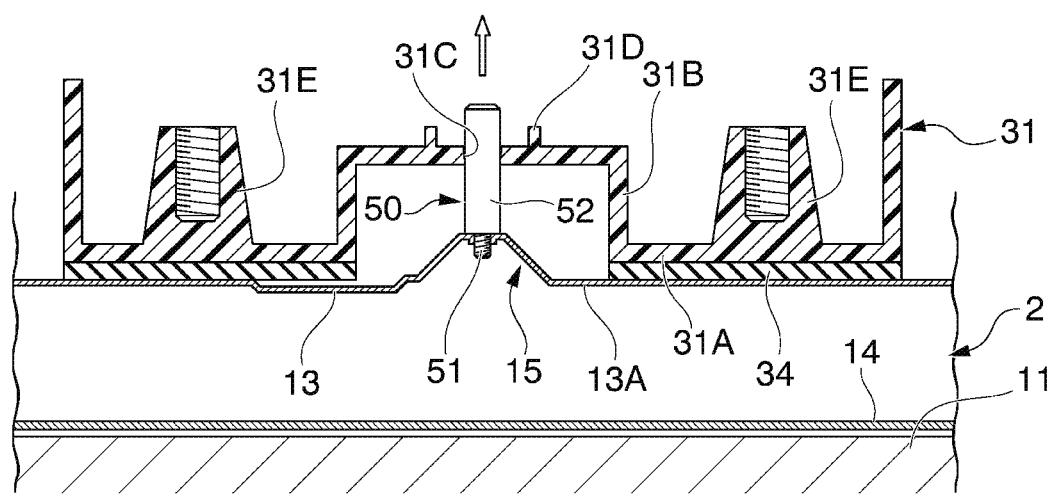
FIG. 6 is a diagram showing a manufacturing process subsequent to FIG. 5.

Then, the sensor holder 31 is adhered to the backside of the image display unit 2 using the double-sided tape 34, as shown in FIG. 6. The sensor holder 31 is fixed to the backside of the image display unit 2 according to attachment of the double-sided tape 34. Thereafter, the positioning jig 50 screwed into the passage hole 15B of the diaphragm opening 15 is detached from the passage hole 15B. Then, the positioning jig 50 is pulled out from the sensor inspection hole 31C backward and removed.

Figure 7:
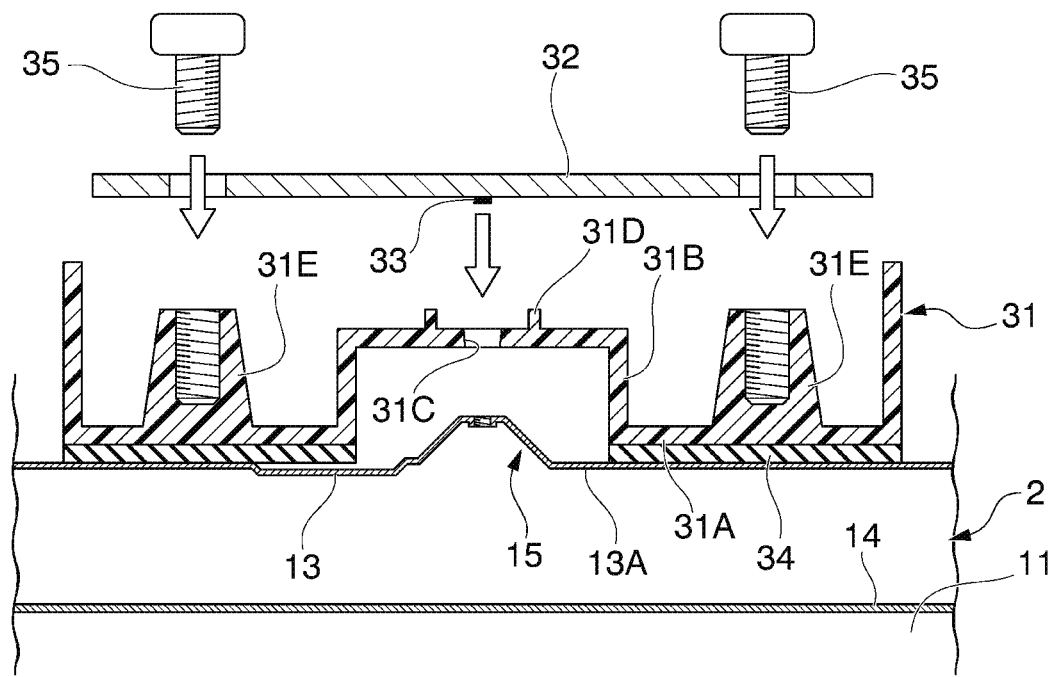
FIG. 7 is a diagram showing a manufacturing process subsequent to FIG. 6.

After the positioning jig 50 is removed, the screws 35 are inserted into the through-holes provided in the sensor board 32 and fastened to the screw receiving parts 31E provided in the sensor holder 31, as shown in FIG. 7. In this manner, the sensor board 32 is mounted on the sensor holder 31. The positional relationship between the sensor holder 31 and the sensor board 32 has been adjusted in advance. Accordingly, the optical sensor 33 is disposed immediately behind the sensor inspection hole 31C.

As described above, in the image display device 1 of the embodiment of the present invention, positioning of the sensor holder 31 which holds the sensor board 32 on which the optical sensor 33 is mounted is performed when the optical sensor 33 is disposed on the backside of the image display unit 2. The passage hole 15B through which light from the backlight 12 passes and which is provided on the backside of the image display unit 2 is used for positioning of the sensor holder 31. Since the positioning jig 50 is fitted into this passage hole to perform positioning of the sensor holder 31, it is possible to easily perform positioning and reduce time and effort required to install the optical sensor.

Furthermore, the passage hole 15B is formed as a screw hole having a screw groove and positioning is performed in such a manner that the screw part 51 of the positioning jig 50 is screwed into the passage hole 15B. Here, positioning is performed using one selected from a plurality of positioning jigs having different diameters of screw parts as a positioning jig. Accordingly, even when the light detector 3 is provided in the image display unit 2 of an aspect, for example, it is possible to dispose the optical sensor 33 immediately behind the passage hole 15B in the image display unit 2 with high accuracy.

While an embodiment of the present invention has been described in detail with reference to the drawings, a specific configuration is not limited to this embodiment and also includes design and the like without departing from the gist of the present invention.

REFERENCE SIGNS LIST

1 Image display device
2 Image display unit
3 Light detector
11 Display
12 Backlight
13 Housing
13A Reflection sheet
14 Diffusion plate
15 Diaphragm opening (opening)
15A Diaphragm
15B Passage hole
15X Opening
31 Sensor holder
31C Sensor inspection hole
31D Partition plate
31E Screw receiving part
32 Sensor board
33 Optical sensor
34 Double-sided tape
35 Screw
50 Jig
51 Screw part
52 Jig part

The invention claimed is:

1. An image display device having an image display unit including a display for displaying images and a backlight arranged behind the display to illuminate the display, the image display device comprising:
    an opening formed behind the image display unit;
    an optical sensor which detects light passing through the opening; and
    a sensor holder which holds the optical sensor,
    wherein the opening includes a protruding diaphragm and a passage hole,
    wherein a screw groove is formed at the passage hole.

2. The image display device according to claim 1, wherein the passage hole is provided at a top of the diaphragm or near the top of the diaphragm.

3. The image display device according to claim 1, wherein the opening is disposed at approximately a center of the image display unit.

4. The image display device according to claim 1, wherein the sensor holder includes a sensor hole,
    wherein the sensor hole is superposed on the passage hole in a front view.

5. A manufacturing method of an image display device, the image display device having
    an image display unit that includes a display for displaying images and a backlight arranged behind the display to illuminate the display,
    an opening formed behind the image display unit,
    an optical sensor which detects light passing through the opening, and
    a sensor holder which holds the optical sensor,
    the manufacturing method comprising:
    mounting a positioning jig on the opening;
    fixing the sensor holder positioned by the positioning jig to a backside of the image display unit; and
    removing the positioning jig after the mounting and the fixing.

* * * * *